Patented Apr. 27, 1954

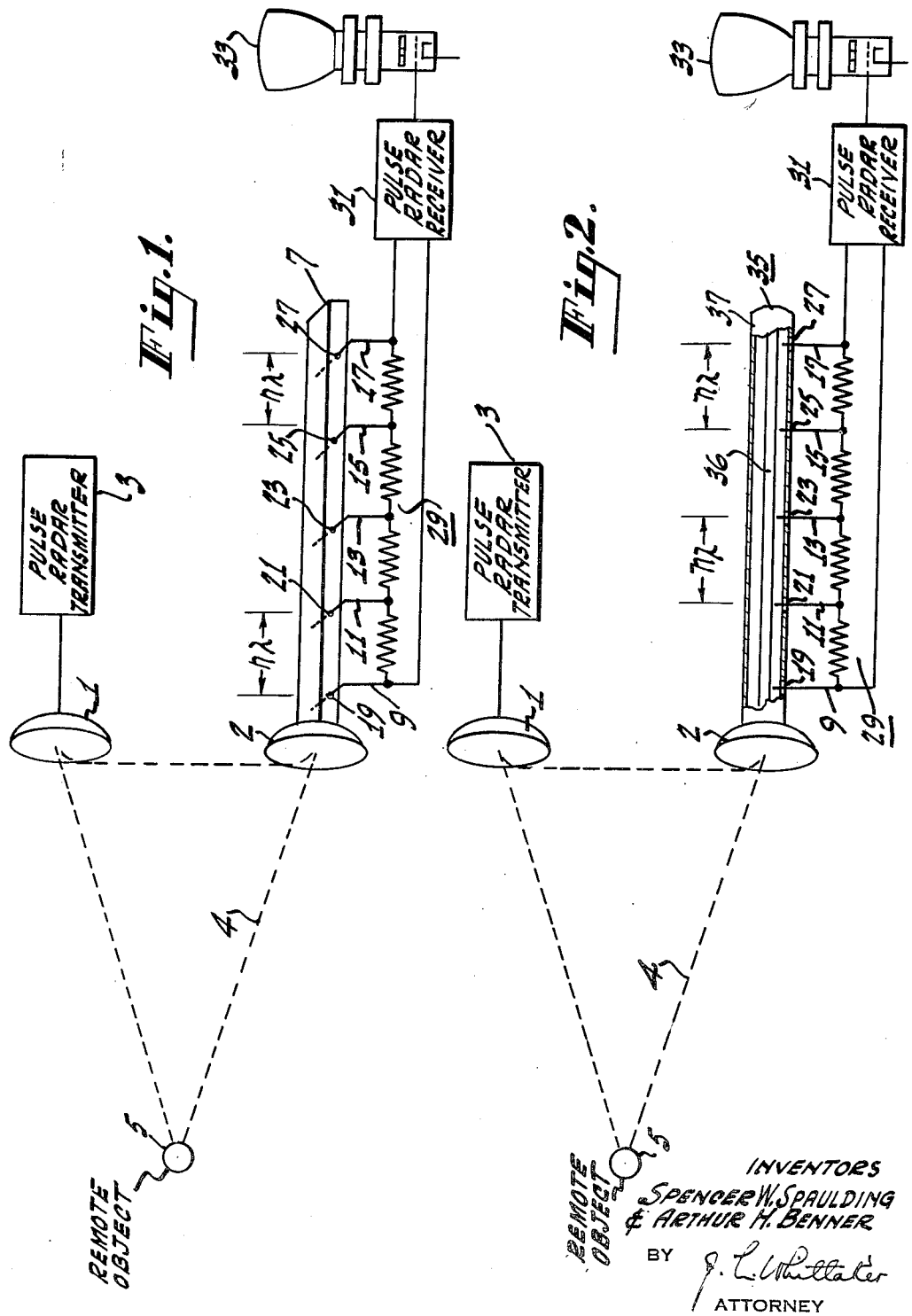

2,677,128

UNITED STATES PATENT OFFICE 2,677,128

SYSTEM FOR IMPROVING THE SIGNAL-TO-NOISE RATIO IN REPETITIVE SIGNAL SYSTEMS

Spencer W. Spaulding, Haddonfield, and Arthur H. Benner, Collingswood, N. J., assignors to Radio Corporation of America, a corporation of Delaware Application December 29, 1950, Serial No. 203,373

7 Claims. (Cl. 343—17.1)

This invention relates generally to radar systems and more particularly to increasing the sensitivity of radar receivers.

Remote objects may be detected by radiating pulses of radio frequency energy, which, after reflection by the remote object, are received to indicate the existence of the object. The distance from the radiating source of R. F. energy to the object can be determined by measuring the time interval between the outgoing and the incoming pulses. This timing is indicated by modulating the sweep or the beam intensity of a cathode ray tube with the returning pulse echo signals. When the remote object, reflecting the radio frequency pulses, is located a considerable distance away from the radiating source of energy, the reflected signal energy will be quite small and the amplitude of the noise attending this reflected signal may be large in comparison with the amplitude of the desired signal.

Some previously known circuits utilize selective frequency amplifiers to amplify the reflected energy to the exclusion of the amplification of the noise which, being statistical in nature, varies in frequency, phase, and amplitude. Variations in the radiated pulse width, however, would control the effective degree of selectivity of the amplifier. Other known circuits receive the pulse echo signals and pass the echoes through a clipper circuit. The portion of the pulse echo signal then amplified is that portion which is greater in amplitude than the amplitude of the attendant noise. This arrangement reduces the accuracy of the ranging circuit and also provides no means for receiving echo signals of amplitude equal to, or less than, the amplitude of the attending noise signals.

An object of the invention is to provide a pulse echo receiver having improved sensitivity.

Another object of the invention is to utilize the statistical characteristics of ambient noise to improve the signal-to-noise ratio in a pulse echo receiver.

A further object is to distinguish more efficiently between repetitive signals and signals of a random or statistical nature.

In accordance with the invention, incoming pulse echoes reflected by some remote object, and attendant noise, are directed by a receiving antenna into a delay line. The delay line includes a number of taps spaced such that the time delay between successive taps is an integer times the R. F. period of the transmitter. Connections to these taps each couple a portion of the desired incoming repetitive signal and the undesired noise to a circuit for recombination of the aforementioned pulse echo and noise signals. The statistical characteristics of noise, in the recombination, effectively diminishes the noise signal strength and relatively increases the signal strength of the desired pulse echoes, and hence improves the signal-to-noise ratio of the pulse echo receiver. The recombined pulse echoes minus much of the attendant noise are then coupled to a radio frequency amplifier for amplification thereof and application to the signal circuit of a cathode ray tube.

The invention will be described more fully with reference to the accompanying drawing of which Figure 1 is a combination block diagram and schematic diagram of a pulse radar transmitter and the input circuit of a pulse radar receiver; and Figure 2 is a second embodiment according to the invention, using a coaxial transmission line. Like reference characters are applied to like elements throughout the drawing.

Referring to Figure 1 of the drawing a directive transmitting antenna 1 radiates into space high frequency energy generated by a pulse radar transmitter 3. A portion 4 of this high frequency electromagnetic energy is reflected to the receiving antenna 2 by some remote object 5. The returning pulse echoes are coupled from the receiving antenna 2 into a microwave transmission delay line such as a rectangular hollow pipe waveguide 7. A plurality of electromagnetic energy coupling probes 9, 11, 13, 15, 17 are inserted into the waveguide 7 through a plurality of coupling apertures 19, 21, 23, 25, 27. These coupling probes 9, 11, 13, 15, 17 each couple from the transmission line 7 a portion of the returning pulse echo signal and a similar portion of the attendant ambient statistical noise signal. The apertures 19, 21, 23, 25, 27 for the coupling probes 9, 11, 13, 15, 17 are respectively spaced such that the signal and noise energy is coupled from the transmission line 7 at time intervals corresponding to integral periods $n\lambda$ of the radiated radio frequency signals, where $n$ is an integer and $\lambda$ is the R. F. period of the transmitter 3. The transmission line 7 therein constitutes a delay line in which time delay interval $n\lambda$, fixed by proper selection of the integer "$n$," effectively reduces correlation in frequency, in phase, and in amplitude between the aforementioned portions of the noise signal. The R. F. signal and noise energy thus derived from the transmission line 7 is applied to a resistive network 29 wherein the pulse echo signals, and attendant noise signals, are recombined. The recombined pulse echo signal amplitudes, occurring at integral numbers times the R. F. period of the radar transmitter 3, are additive. The recombination of the noise signals is such that they add at different frequencies, different phase positions, and at different amplitudes. The noise level effectively diminishes while the desired pulse echo level remains constant. The output from the recombining network 29 is coupled to a pulse radar receiver 31 for amplification therein, and thence coupled to the signal circuit of a cathode ray tube 33 for viewing.

A second embodiment of the invention, referring to Figure 2, includes a microwave transmission delay line comprising a coaxial transmission line 35 wherein the plurality of frequencies which cumulatively form the envelope of the pulse transmitted by the radar transmitter 3 have equal phase velocities in traveling along the coaxial transmission line 35. The coaxial transmission line 35 includes an inner conductor 36 and an outer conductor 37. A plurality of coupling probes 9, 11, 13, 15, 17 are inserted through a plurality of associated apertures 19, 21, 23, 25, 27 in the outer conductor 37 of the transmission line 35. The operation of the circuit of Figure 3 is similar to that of the circuit of Figure 1. Circular and elliptical hollow pipe waveguides also operate satisfactorily in the above described circuits.

If a plurality of coupling probes, say "$x$," are inserted into either transmission line in Figure 1 or Figure 2, the incoming pulse echo signals and attendant noise signals are divided into "$x$" parts. Upon recombination in the above manner, the peak amplitude of the echo remains the same but the pulse shape changes slightly. Practice has shown, since the attendant statistical noise diminishes, that the improvement in the signal-to-noise ratio in a system of this nature is proportional to $\sqrt{x}$. The number "$x$" is determined by the maximum allowable pulse distortion and the minimum delay useful in making the noise diminish.

What is claimed is:

1. A system for increasing the ratio between recurrent pulse echo radio frequency signal strength and attendant statistical noise signal strength during a given echo ranging cycle including time delay means for delaying said recurrent signals and said attendant noise signals for a plurality of time intervals each corresponding to integral numbers of periods of said radio frequency signals, a plurality of means disposed along said time delay means as a function of said intervals each of said means being for deriving portions of said delayed recurrent pulse echo signals and said attendant noise signals, and means coupled to each of said signal deriving means for recombining said derived portions of delayed recurrent pulse echo signals and statistical noise signals whereby the statistical characteristics of noise in said recombination effectively diminishes said attendant noise signal strength and relatively increases said recurrent signal strength, and means coupled to said recombining means for amplification of said recombined signals.

2. A system according to claim 1 wherein said means for delaying said recurrent pulse echo signals and said attendant noise signals comprises a microwave transmission line.

3. A system according to claim 2 wherein said means deriving a plurality of said delayed recurrent pulse echo signals and said attendant noise signals comprises a plurality of probes inserted through associated apertures in a wall of said microwave transmission line for coupling electromagnetic energy therefrom.

4. A system according to claim 1 wherein said means for delaying said recurrent pulse echo signals and said attendant noise signals comprises a hollow pipe waveguide transmission line.

5. A system according to claim 1 wherein said means for delaying said recurrent pulse echo signals and said attendant noise signals comprises a coaxial microwave transmission line.

6. A system according to claim 1 wherein said signal and noise recombining means coupled to said pulse deriving means comprises a resistive network.

7. A system according to claim 1 wherein said amplifying means coupled to said recombining means comprises a conventional pulse echo radar receiver.

References Cited in the file of this patent
UNITED STATES PATENTS

| Number | Name | Date |
|---|---|---|
| 1,683,847 | Roos | Sept. 11, 1928 |
| 2,401,416 | Eaton et al. | June 4, 1946 |
| 2,410,233 | Percival | Oct. 29, 1946 |
| 2,487,995 | Tucker | Nov. 15, 1949 |
| 2,523,283 | Dickson | Sept. 26, 1950 |